US006944363B2

(12) United States Patent
Li et al.

(10) Patent No.: US 6,944,363 B2
(45) Date of Patent: Sep. 13, 2005

(54) MINIATURE MAGNETO-OPTIC FIBER OPTICAL SWITCH

(75) Inventors: Shifang Li, Pleasanton, CA (US); Qing Shao, Sunnyvale, CA (US)

(73) Assignee: Oplinic Communications, Inc., San Jose, CA (US)

( * ) Notice: Subject to any disclaimer, the term of this patent is extended or adjusted under 35 U.S.C. 154(b) by 187 days.

(21) Appl. No.: 10/645,960

(22) Filed: Aug. 22, 2003

(65) Prior Publication Data

US 2005/0041908 A1 Feb. 24, 2005

(51) Int. Cl.[7] ............................ G02B 6/27; G02B 27/28

(52) U.S. Cl. ......................... 385/16; 359/495; 359/484; 359/281; 385/11

(58) Field of Search ................................ 359/280, 281, 359/324, 484, 494–497; 385/11, 16–24

(56) References Cited

U.S. PATENT DOCUMENTS 5,724,165 A 3/1998 Wu ............................ 359/117
6,173,092 B1 1/2001 Bergmann .................. 385/16
6,360,034 B1 3/2002 Chang ........................ 385/18
6,707,960 B2 * 3/2004 Li et al. ...................... 385/18
6,795,245 B2 * 9/2004 Xiao .......................... 385/11

* cited by examiner

*Primary Examiner*—Rodney Bovernick
*Assistant Examiner*—Omar Rojas
(74) *Attorney, Agent, or Firm*—Lumen Intellectual Property Services, Inc.

(57) ABSTRACT

An optical switch uses a walk-off crystal together with a Wollaston prism, a Faraday rotator, and a halfwave plate pair and a single collimating lens of one multiple-fiber pigtail for both input and output optical beams. In one embodiment, an input beam enters the device through one port of a tri-fiber pigtail, and a switched beam exits the device through a second or third port of the same tri-fiber pigtail, depending on a state of the Faraday rotator. All three beams use the same pigtail and collimating lens.

2 Claims, 2 Drawing Sheets

MINIATURE MAGNETO-OPTIC FIBER OPTICAL SWITCH

FIELD OF THE INVENTION

The present invention relates generally to optical switching devices and methods. More specifically, it relates to magneto-optic switching.

BACKGROUND OF THE INVENTION

Optical switches are very important devices in optical networks. They are used for network protection, cross connection, add/drop applications, etc. There are many kinds of optical switching devices, including mechanical, electro-optic, thermo-optic, acousto-optic, magneto-optic, and semiconductor. Each switching technology has its own advantages, but typically has drawbacks as well. Mechanical switches are currently the most widely used routing components and provide very low insertion loss and crosstalk characteristics. But their switching times are limited to the millisecond range and they have large sizes. Moreover, due to the use of motor-driven parts, they have limited switch lifetime and thus present reliability issues.

Various attempts have been made to overcome the problems associated with mechanical switching. Most notably, various U.S. patents disclose optical switches that use birefringent walk-off crystals and polarization rotators to perform optical switching. For example, U.S. Pat. No. 6,173,092 discloses an optical mirror switch using a pair of walk-off crystals, a Faraday rotator, and a mirror. U.S. Pat. No. 6,360,034 discloses a reflection-based optical switch that uses Faraday rotators and walk-off crystals. U.S. Pat. No. 5,724,165 discloses in FIGS. 4a and 4b a reflective optical switch that uses two walk-off crystals and a polarization rotator array. Common to the design of these three patents is the use of two walk-off crystals. As a result of this design, the switched optical beams exiting the devices are separated by a walk-off displacements. In other words, the beams in the two switched states approach the exit fibers along optical paths that are parallel to each other. Because the beams are parallel, multiple collimating lenses are required to collect the beams and direct them into their respective fibers. Consequently, these switches need several single-fiber pigtails to couple fibers into and out of the device.

SUMMARY OF THE INVENTION

The present invention provides an optical switch with excellent optical performance, high switch speed, and small size. In contrast with existing switches that use two walk-off crystals, the present invention uses a walk-off crystal together with a specially-designed Wollaston prism. One important feature of this design is that the switched beams approaching the exit of the device are not parallel to each other or to the optical axis. The Wollaston prism is designed so that a single collimating lens of one multiple-fiber pigtail can collect both switched beams and direct them into the fibers. In one embodiment, an input beam enters the device through one port of a tri-fiber pigtail, and both switched beams exit the device through second and third ports of the same tri-fiber pigtail. All three beams use the same pigtail and collimating lens. The present invention thus provides a compact design that requires fewer parts and lower cost than other designs having several pigtails for coupling fibers into and out of the switch.

DETAILED DESCRIPTION

Figure 1:
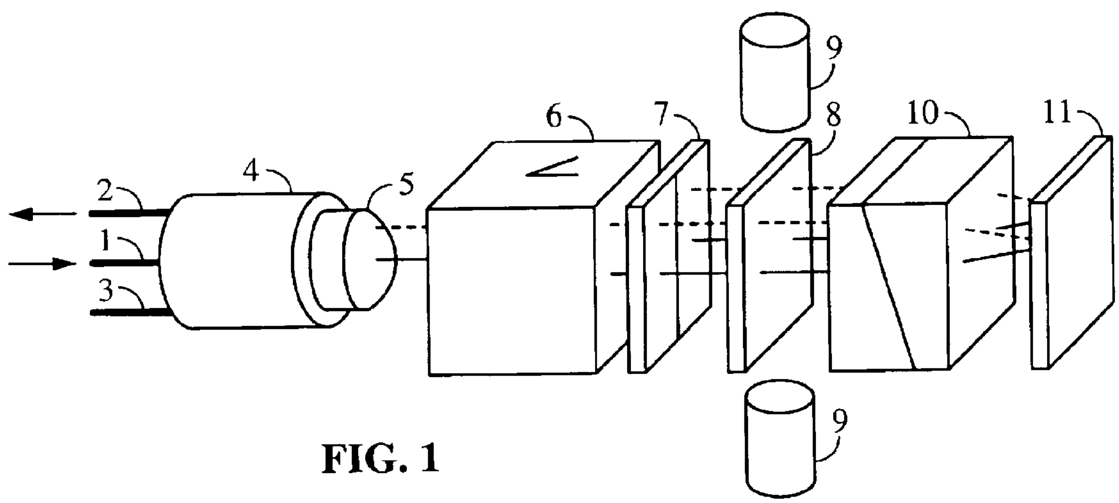
FIGS. 1 and 2 show a preferred embodiment of the present invention in first and second switched states, respectively.

A preferred embodiment of the invention is illustrated in FIG. 1. A triple-fiber pigtail 4 is coupled to optical fibers 1, 2 and 3 through first, second and third ports of the pigtail 4. An input optical beam enters through fiber 1, and the device selectively switches this beam to exit through either fiber 2 or fiber 3. After entering the pigtail, the input beam passes through a collimating lens 5, a birefringence crystal 6, a halfwave plate pair 7, a Faraday rotator 8 controlled by an electromagnet 9, a Wollaston prism 10, and a mirror 11. The mirror 11 reflects the signal back through the same components in the opposite direction. Depending on the switched state of the Faraday rotator 8, the signal is coupled to one or the other of fibers 2 and 3.

The beam paths illustrated in FIG. 1 correspond to a first switched state of the device. The input optical beam enters from fiber 1, passes through collimated by focusing lens 5 and then enters birefringent crystal 6 which separates the optical beam into two component beams having orthogonal polarizations. These two spatially separated component beams pass through separate halfwave plates of halfwave plate pair 7. The optical axes of the two halfwave plates are oriented in such a way that the component beams emerge from the waveplate pair with the same polarization state. These two beams then pass through Faraday rotator 8. In the first switched state illustrated in FIG. 1, the Faraday rotator is not activated and does not rotate the polarization states of the two component beams.

The two component beams then pass through Wollaston prism 10 which equally refracts the two spatially separated beams according to their common polarization state. The beams are then reflected from mirror 11 which is oriented so that it is perpendicular to the beams entering from fiber 1. The reflected beams then pass back through Wollaston prism 10 which refracts the two beams again. When the beams exit the Wollaston prism, they are propagating in a direction that is not parallel to the optical axis of the device. Wollaston prism 10 has the effect of not merely displacing the beams, but also introducing a change in the angle of propagation relative to the optical axis.

After exiting Wollaston prism 10, the two beams pass again through Faraday rotator 8. In the first switched state illustrated in FIG. 1, the Faraday rotator introduces no change in the polarization states of the two beams. The two beams then pass through two respective halfwave plates of halfwave plate pair 7. The effect of these halfwave plates is to change the polarization states of the two beams from having a common polarization to two orthogonal polarizations. The two beams then pass back through birefringence crystal 6 which recombines the two polarization components into one beam again. The beam then passes through collimating lens 5 and into the pigtail 4. The mirror 11 and Wollaston prism 10 are designed and aligned in such a way that the combined beam in this switched state will exit through output fiber 2. For example, the mirror may be oriented perpendicular to the beam entering from fiber 1, and the appropriate deviation angle is generated by Wollaston prism 10.

Figure 2:
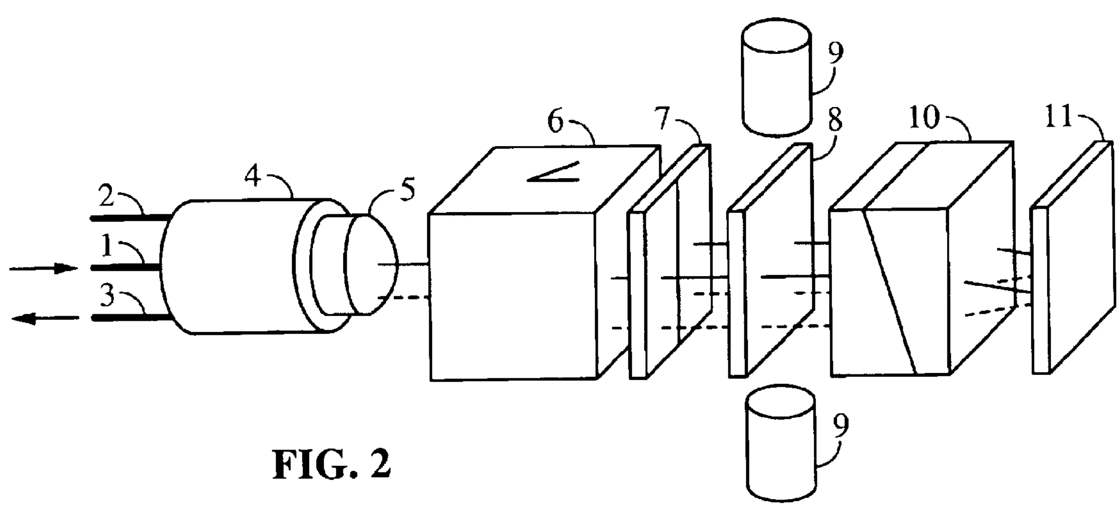

The second switched state of the same device is illustrated in FIG. 2. In this state, an optical beam enters through fiber 1 and passes through collimating lens 5, is split by birefringent crystal 6 into two orthogonal polarization components, and these two components are made to have the same polarization by halfwave plate pair 7, just as in the first switched state. In the second switched state, however, electromagnet 9 is activated by passing a current through it. Activated electromagnet 9 generates a magnetic field that is sufficiently strong and in sufficiently close proximity to Faraday rotator 8 that the magnetic field alters the optical properties of Faraday rotator 8. As a result, the two component beams passing through the Faraday rotator will both have their common polarizations rotated by 90°. The two polarization-rotated component beams then pass through Wollaston prism 10 which equally refracts the two spatially separated beams according to their common polarization state. Because their common polarization is rotated by 90° relative to the first switched state, in this state the Wollaston prism 10 refracts them at a second angle distinct from the first angle corresponding to the first switched state. The beams are then reflected from mirror 11 and pass back through Wollaston prism 10 which refracts the two beams again. When the beams exit the Wollaston prism, they are propagating in a direction that is not parallel to the optical axis of the device, and not parallel to the direction of the beams in the first switched state. Wollaston prism 10 has the effect of not merely displacing the beams, but also introducing a change in the angle of propagation relative to the optical axis. In the second switched state, however, both the beam displacement and deflection angle are different from those in the first switched state.

These two beams then pass back through Faraday rotator 8, which again rotates their common polarization by 90°. The two components then pass through halfwave plate pair 7, which produces two orthogonal components, and then through birefringence crystal 6, which combines them into a single beam. The mirror 11 and Wollaston prism 10 are designed and aligned in such a way that the combined beam in this switched state will exit through output fiber 3. For example, the mirror may be oriented perpendicular to the beam entering from fiber 1, and the appropriate deviation angle is generated by Wollaston prism 10.

As is evident from the above description, the input optical signal entering the device from fiber 1 is switched between output fiber 2 to output fiber 3 depending on whether or not electromagnet 9 activates Faraday rotator 8.

Figure 3:
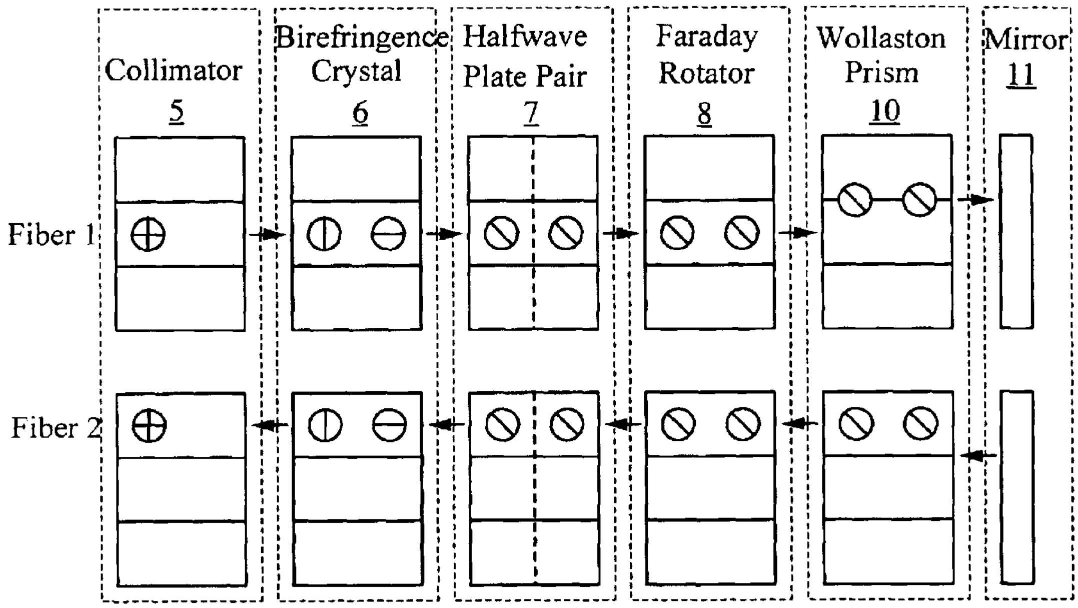
FIGS. 3 and 4 are schematic diagrams illustrating the polarization states of optical beams passing through the devices of FIGS. 1 and 2, respectively.
Figure 4:
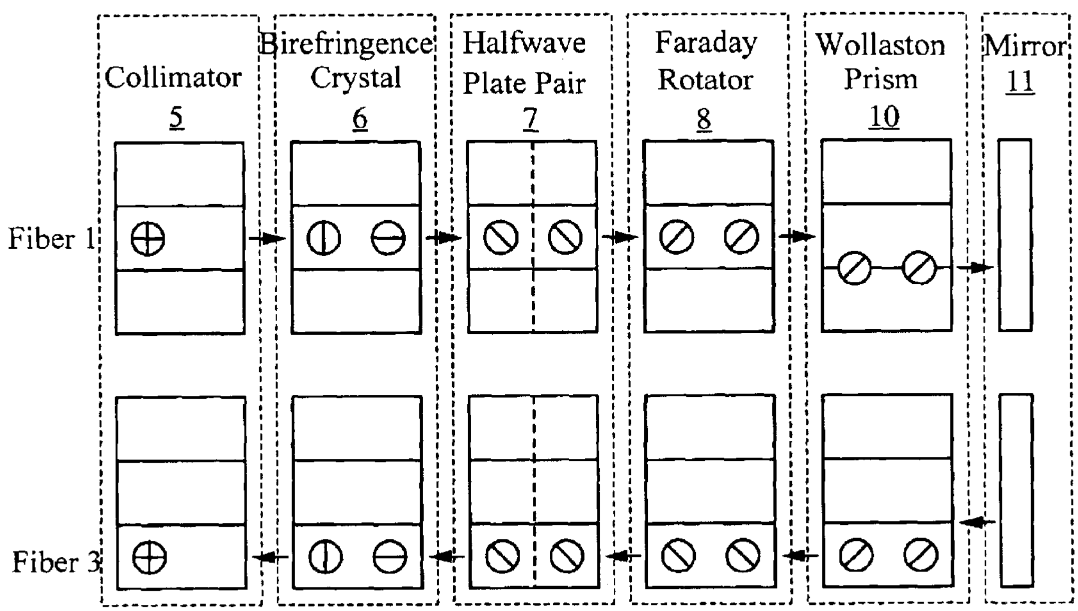

FIGS. 3 and 4 are schematic figures that illustrate how the various optical components of the device alter the polarization and position of the beams in the first and second switched states of the device, respectively. As shown in FIG. 3, in the first switched state the entering optical beam has both polarizations. The effect of the birefringent crystal is to separate this beam into two components having orthogonal components. The halfwave plate pair then rotates these components so that they have a common polarization. The operation so far is the same as in the second switched state, shown in FIG. 4. In the first switched state (FIG. 3), the Faraday rotator has no effect on the beams, while in the second switched state (FIG. 4), their polarizations are both rotated by 90°. Due to the difference in polarization, the Wollaston prism then refracts the beams in a first direction in the first switched state (FIG. 3), while refracting them in a second direction in the second switched state (FIG. 4). The beams in the first switched state thus return through the halfwave plate pair and birefringent crystal to exit through fiber 2 (FIG. 3), while the beams in the second switched state exit through fiber 3 (FIG. 4).

Devices of the present invention may be constructed using various materials and techniques known to those skilled in the art of optical switching devices. For example, birefringent crystal 6 may be made of $YVO_4$, calcite, or other materials. The Wollaston prism 10 has two component birefringent crystals whose optical axes are oriented perpendicular to each other. These component crystals may be made of rutile, $YVO_4$, calcite, or other materials. The optical axis of the Wollaston prism 10 as a whole is oriented within the plane perpendicular to the optical axis of the device. The optical axis of the birefringent crystal 6 is within a plane parallel to optical axis, e.g., a plane parallel to the top surface of the crystal 6. The optical axis may tilt at an angle to the optical axis. For example, the angle is about 48° when the crystal 6 is composed of $YVO_4$. The halfwave plate pair may be composed of various suitable materials such as crystal quartz or other materials. The material used for the Faraday rotator may be one of various suitable materials such as a bi-substituted iron garnet crystal or other material. The electromagnet 8 may be any conventional electromagnet having characteristics suitable for the application. In the preferred embodiment, pigtail 4 has a single lens 5 and three ports to accommodate input fiber 1 and output fibers 2 and 3. Each port preferably has a capillary with a polished end surface. The focus lens 5 may be, for example, a grin lens, c-lens, or other suitable lens. Optical elements of the device are oriented relative to a common optical axis for the device with their optical surfaces parallel to each other and perpendicular to the optical axis.

Those skilled in the art will appreciate that there are many variations of the above embodiment. For example, the order of the Faraday rotator and halfwave plate pair may be reversed. In fact, the two halfwave plates could be placed on separate sides of the Faraday rotator. It is also possible to use a single 90° halfwave plate together with a 0° optical element having equivalent optical path length. These and other variations are considered within the scope and spirit of the invention.

What is claimed is:

1. An optical switch device comprising a plurality of optical elements mutually aligned along a common device optical axis, wherein the plurality of optical elements comprises:

a multiple-fiber pigtail for coupling the device to multiple optical ports, a collimating lens coupled to the pigtail such that optical signals associated with the multiple optical ports will all pass through the collimating lens, a birefringent crystal, a halfwave plate pair, a switchable Faraday rotator, an electromagnet for switching the switchable Faraday rotator, a Wollaston prism, and a mirror;

wherein the multiple optical ports comprise a first port and a second port, wherein the switchable Faraday rotator selectively switches the device between a first state and a second state, wherein the switchable Faraday rotator rotates the polarization of light passing through it by 90 degrees when the electromagnet is turned on, wherein the switchable Faraday rotator does not rotate the polarization of light passing through it when the electromagnet is turned off, and wherein the first state couples light between the first port and the second port, and the second state does not couple light between the first port and the second port.

2. A method for optical switching comprising:

collimating an input optical beam delivered from an input port using a focusing lens to produce a collimated beam, spatially separating the collimated beam into two component beams having orthogonal polarizations using a birefringent crystal, passing the two component beams through separate half-wave plates to give the two component beams a common polarization state, passing the two component beams through an electromagnetically switchable Faraday rotator having a first switched state and a second switched state, wherein the switchable Faraday rotator in the first switched state does not rotate the common polarization state of the two component beams, wherein the switchable Faraday rotator in the second switched state rotates the common polarization state of the two component beams by 90 degrees, refracting the two component beams using a Wollaston prism, wherein the two component beams are refracted at a first angle when the switchable Faraday rotator is in the first switched state, and wherein the two component beams are refracted at a second angle distinct from the first angle when the switchable Faraday rotator is in the second switched state, reflecting the two component beams from a mirror so that the two component beams pass back through the Wollaston prism, the switchable Faraday rotator, the separate halfwave plates, and birefringent crystal to produce a recombined beam, and passing the recombined beam through the focusing lens, and coupling the recombined beam into a first output port when the switchable Faraday rotator is in the first state and into a second output port when the switchable Faraday rotator is in the second state.

* * * * *